United States Patent [19]

Baudoin

[11] 4,242,922
[45] Jan. 6, 1981

[54] HYBRID TRANSMISSION DEVICE OF THE HEAT ENGINE TYPE FOR AUTOMOBILES AND MOTOR VEHICLES

[75] Inventor: Patrice Baudoin, Bougival, France

[73] Assignee: Regie Nationale des Usines Renault, Boulogne Billancourt, France

[21] Appl. No.: 821,202

[22] Filed: Aug. 2, 1977

[30] Foreign Application Priority Data

Aug. 6, 1976 [FR] France .................... 76 24060

[51] Int. Cl.³ .................... F16H 47/04; F16D 31/02
[52] U.S. Cl. .................... 74/687; 60/413; 74/847; 180/165
[58] Field of Search .................... 180/165, 307, 308; 74/688, 850, 856, 847, 687; 60/413, 418, 698; 74/686

[56] References Cited

U.S. PATENT DOCUMENTS

| 3,990,235 | 11/1976 | Bauchet | 60/413 |
| 4,024,775 | 5/1977 | Anderson | 74/687 |
| 4,064,694 | 12/1977 | Baudoin | 60/413 |
| 4,096,768 | 6/1978 | Miyao | 74/687 |
| 4,098,144 | 7/1978 | Besel | 60/413 |

FOREIGN PATENT DOCUMENTS

| 2448723 | 4/1976 | Fed. Rep. of Germany | 60/413 |
| 2272859 | 5/1974 | France | 60/413 |
| 2330876 | 11/1975 | France | 60/413 |
| 2332460 | 11/1975 | France | 60/413 |

Primary Examiner—Samuel Scott
Assistant Examiner—G. Anderson
Attorney, Agent, or Firm—Fleit & Jacobson

[57] ABSTRACT

A hybrid transmission system for use in internal combustion engine vehicles provides two modes of vehicle operation. In the first or city mode, the vehicle is propelled by one or more reversible hydraulic motor/pumps which operate as a function of vehicle accelerator pedal displacement and of brake pedal displacement and which are driven by fluid pressure stored in an accumulator. In the second or highway mode, the vehicle is propelled by its internal combustion engine through a mechanical transmission.

During the city mode operation, the accumulator is automatically and intermittently charged by a reversible hydraulic motor/pump driven by the internal combustion engine. Also, during the city mode, the internal combustion engine operates only during intermittent charging of the accumulator.

The hybrid transmission system has automatic regulating units to control the accumulator charging process, to regulate the brake fluid pressure within the master brake cylinder to insure that vehicle braking is solely a function of brake pedal displacement, and to control which reversible hydraulic motor/pump(s) is (are) utilized during the city mode operation.

Additionally, the hybrid transmission system utilizes a manually operated mode/selection device to allow the vehicle operator the choice of first or second mode vehicle operation.

3 Claims, 14 Drawing Figures

HYBRID TRANSMISSION DEVICE OF THE HEAT ENGINE TYPE FOR AUTOMOBILES AND MOTOR VEHICLES

This invention relates to a hybrid transmission system of the heat engine or internal combustion engine type for automobiles and motor vehicles which makes it possible to obtain two modes of transmission, namely either a mechanical mode for highway driving or a hydrostatic mode with oleopneumatic storage of energy for city traffic driving.

Specifically the invention is concerned with a transmission system which comprises a heat engine or internal combustion engine, a reversible, variable displacement hydraulic motor/pump which can be driven by the heat engine, an energy accumulator supplied by said motor/pump, at least one reversible hydroulic driving motor for propelling the vehicle which is supplied by the energy accumulator and/or by said motor/pump operating as a pump and being driven by the engine.

In city traffic driving, the oleopneumatic energy accumulator is recharged intermittently and automatically by the reversible hydraulic motor/pump operating as a pump driven by the heat engine.

During the accumulator charging, the engine operates at practically constant values of speed and torque.

Between two charging stages, the heat engine is not in operation.

When the pressure of the accumulator falls below a set value, the heat engine is started by the hydraulic motor/pump operating as a motor which is supplied by the accumulator.

The use of such accumulators and reversible hydraulic, variable displacement motor/pumps in hybrid vehicles is well known in the art. See for example, applicant's U.S. Pat. No. 4,064,694.

When the driver of the vehicle depresses the accelerator pedal, the accumulator discharges into the reversible hydraulic driving motor or motors operating as such as to propel the vehicle.

When the driver applies the vehicle brakes, the reversible hydraulic motor or motors operate as a pump run by the rotation of the moving vehicles wheels and, therefore, serve to recover part of the kinetic or potential energy of the moving vehicle in order to recharge the accumulator.

For highway driving conditions, the second mode of operation may be selected wherein said speed-changing mechanism or gearbox is provided between the engine and the vehicle wheels and said engine continuously drives the speed-changing mechanism or gearbox in a conventional manner. In this mode, the reversible hydraulic motor/pumps are stopped, and the accumulator cannot be discharged.

The invention is primarily directed to such a combined hybrid transmission system further provided with a control and switching device operable by the driver who may select at will either the hydrostatic operation mode or the mechanical operation mode for travel in urban areas or on the highways, respectively.

As will be seen the advantages of the system in accordance with the invention are as follows:

- the performances in both modes of travel are independent;
- the fuel consumption, noise and atmospheric pollution are reduced under city traffic conditions as a result of energy recovery during brake application and as a result of intermittent operation of the heat engine at practically constant values of speed and torque;
- in city traffic, the driver uses only an accelerator and a brake, resulting in enjoyment of the advantages of an automatic transmission;
- fuel consumption on highways corresponds to that of a conventional vehicle.

Further characteristics and advantages of the invention will be apparent from the following description which is given merely by way of example. To this effect, reference is made to the accompanying drawings, wherein.

Figure 3:
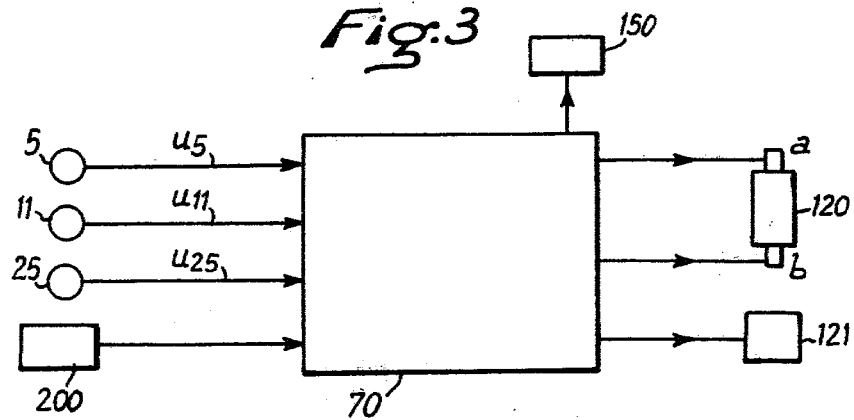
Figure 4:
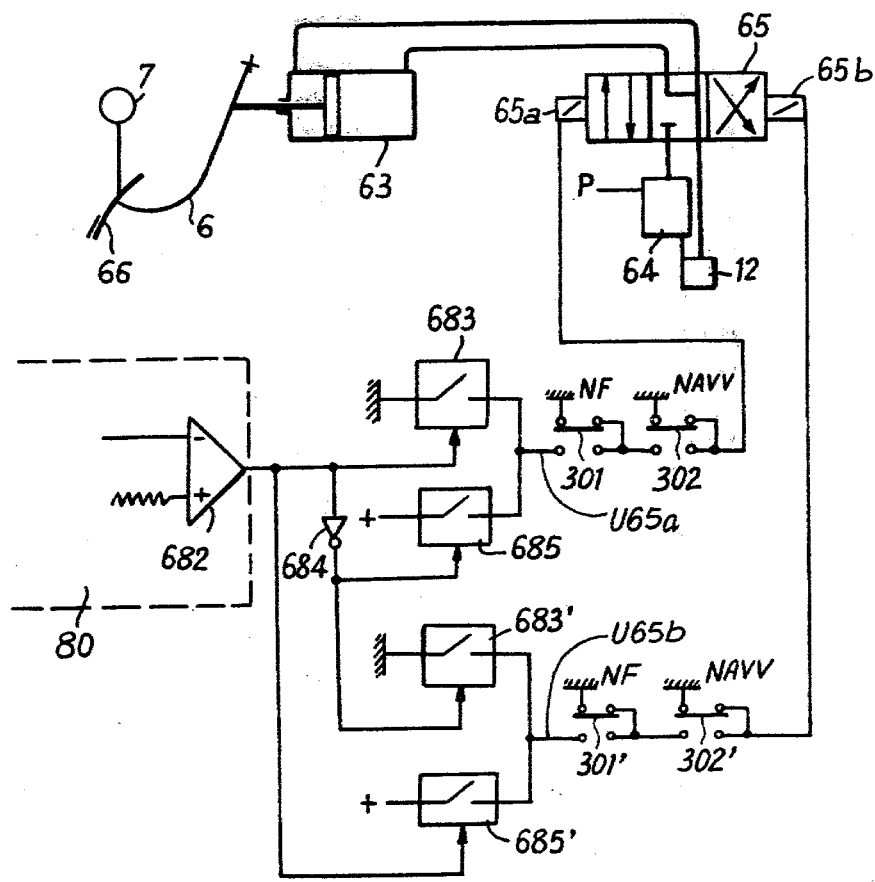
Figure 5:
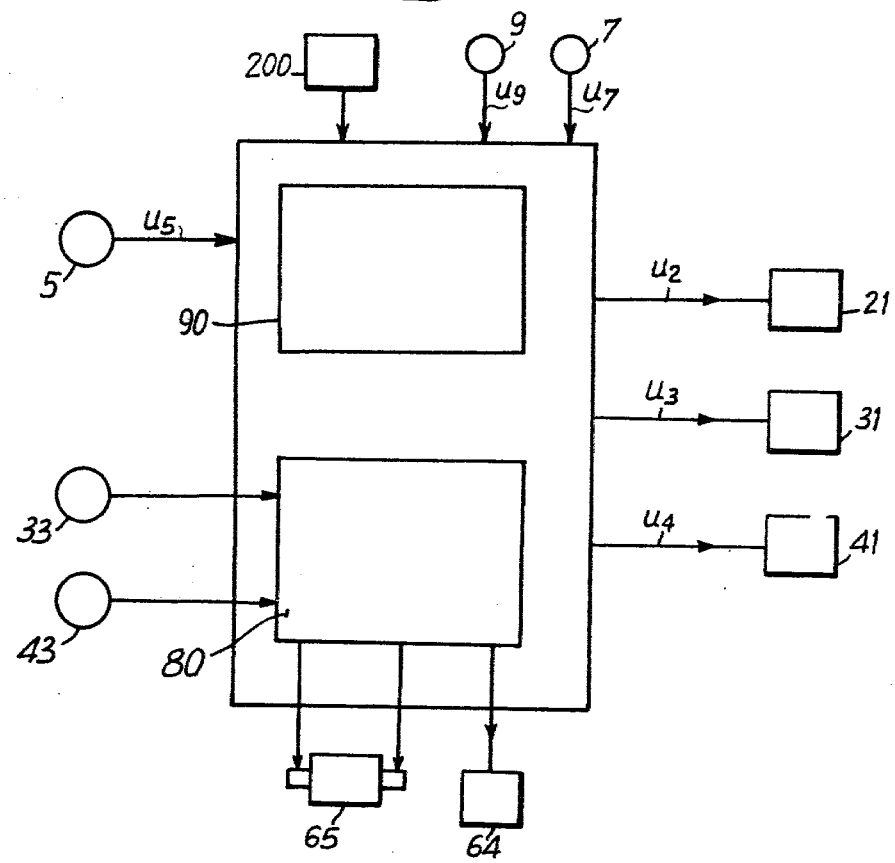
Figure 6:
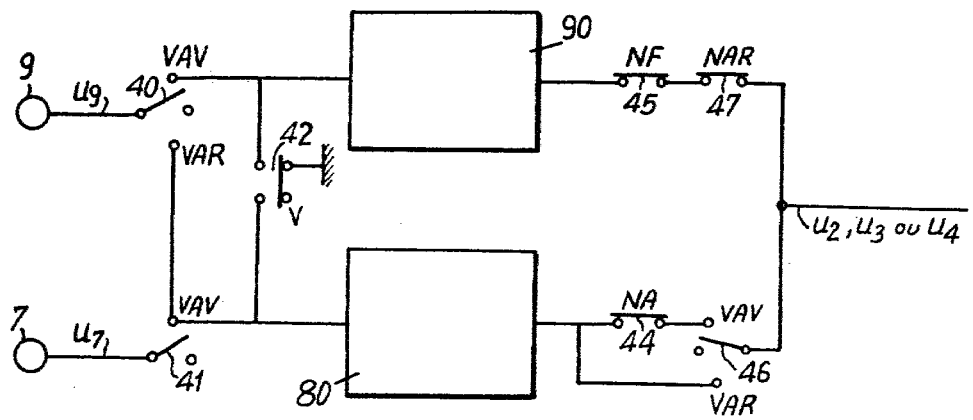
Figure 7:
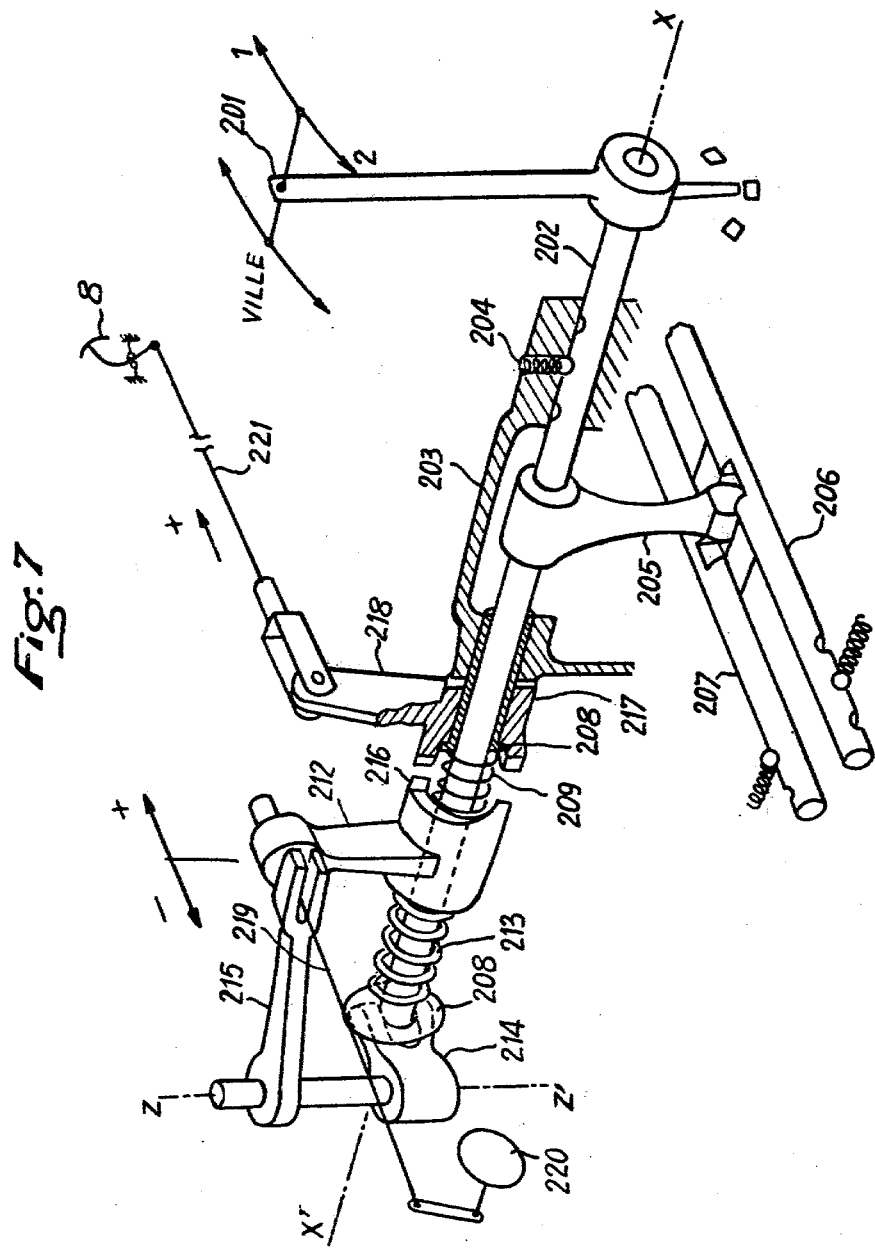
Figure 8:
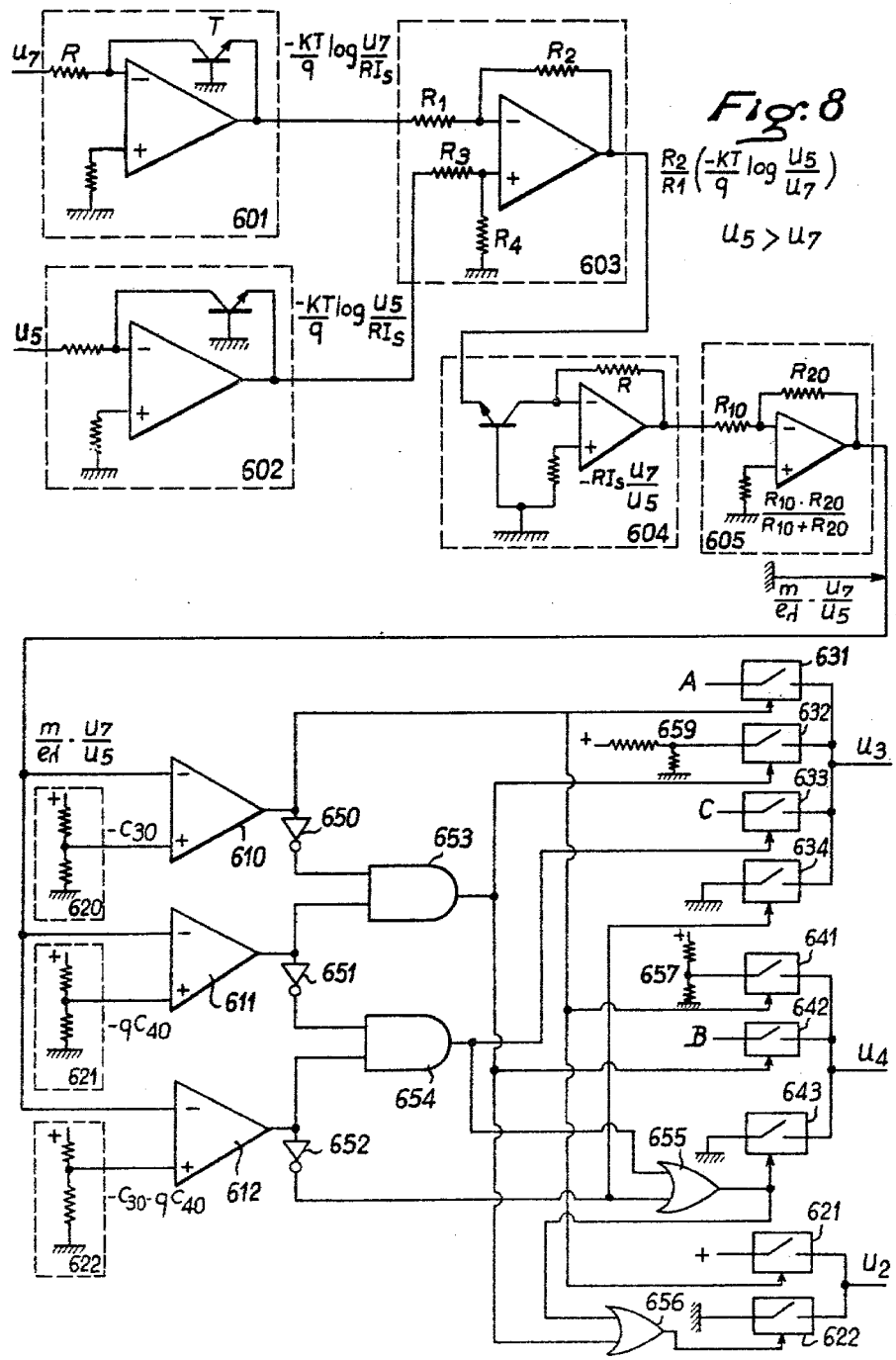
Figure 9:
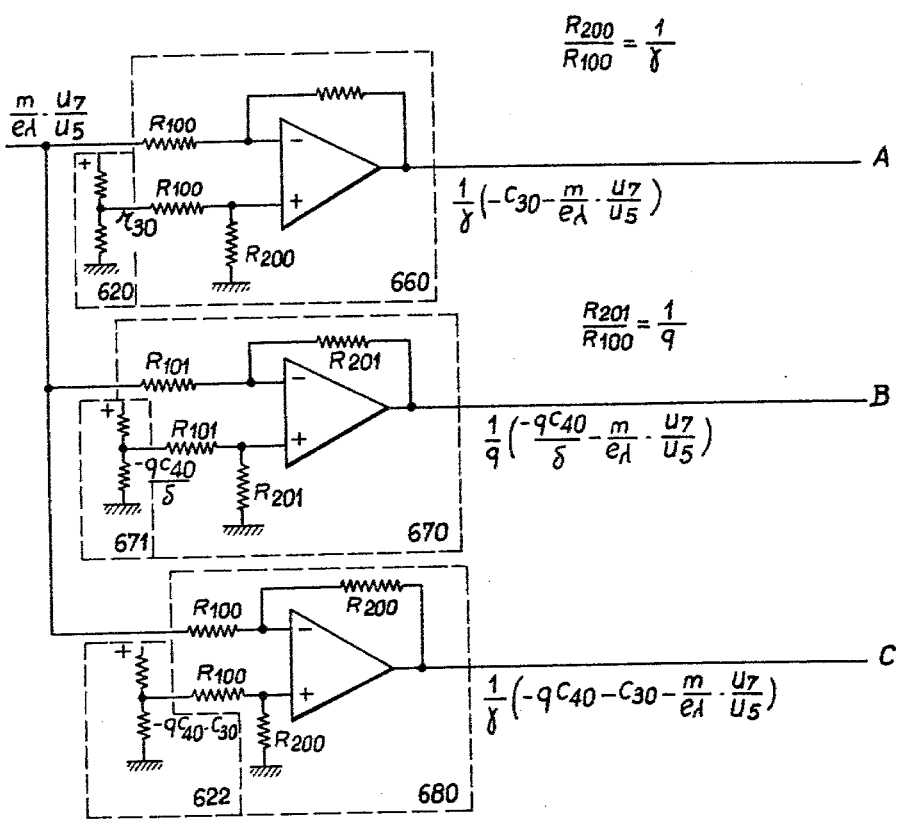
Figure 10:
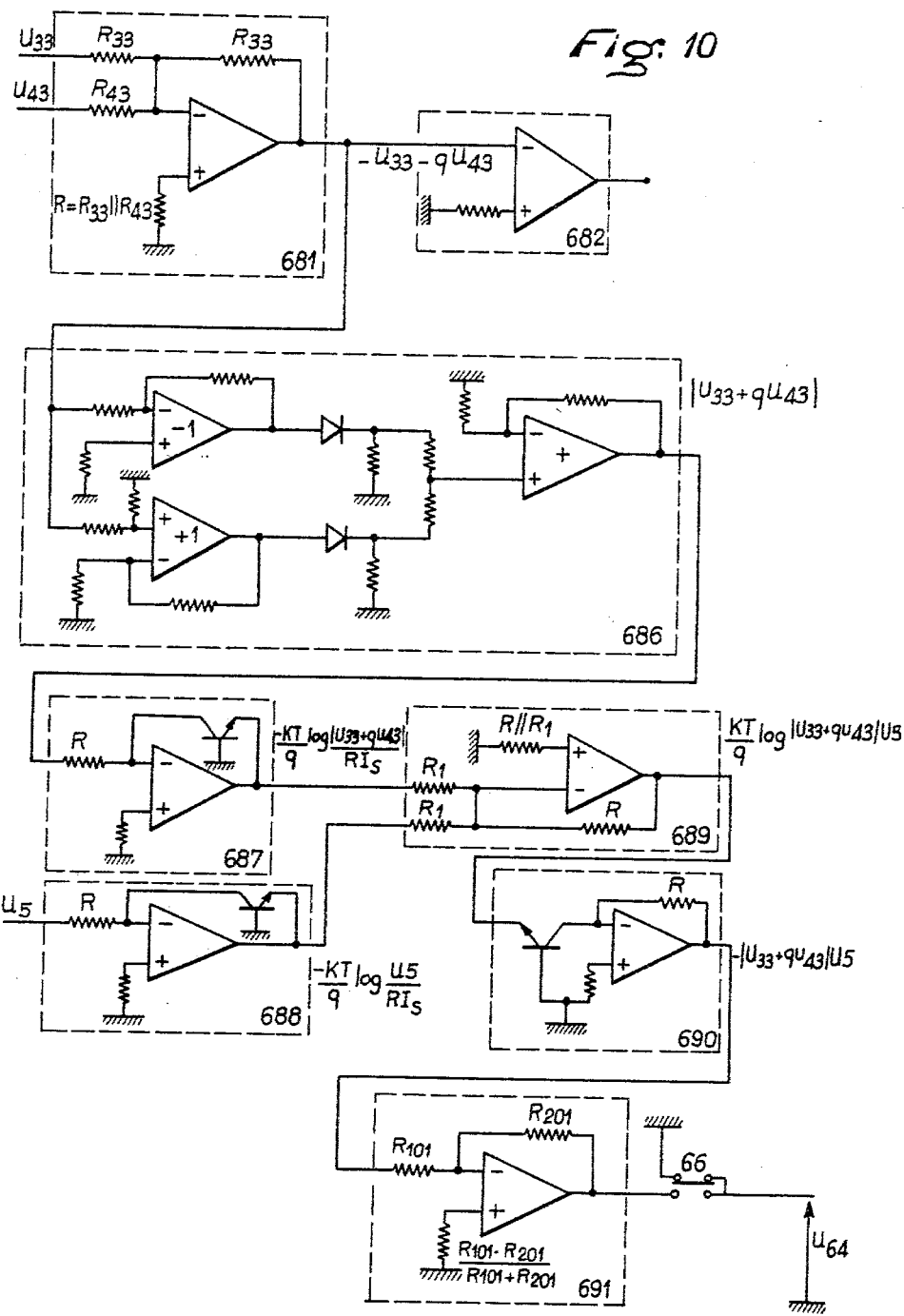
Figure 11:
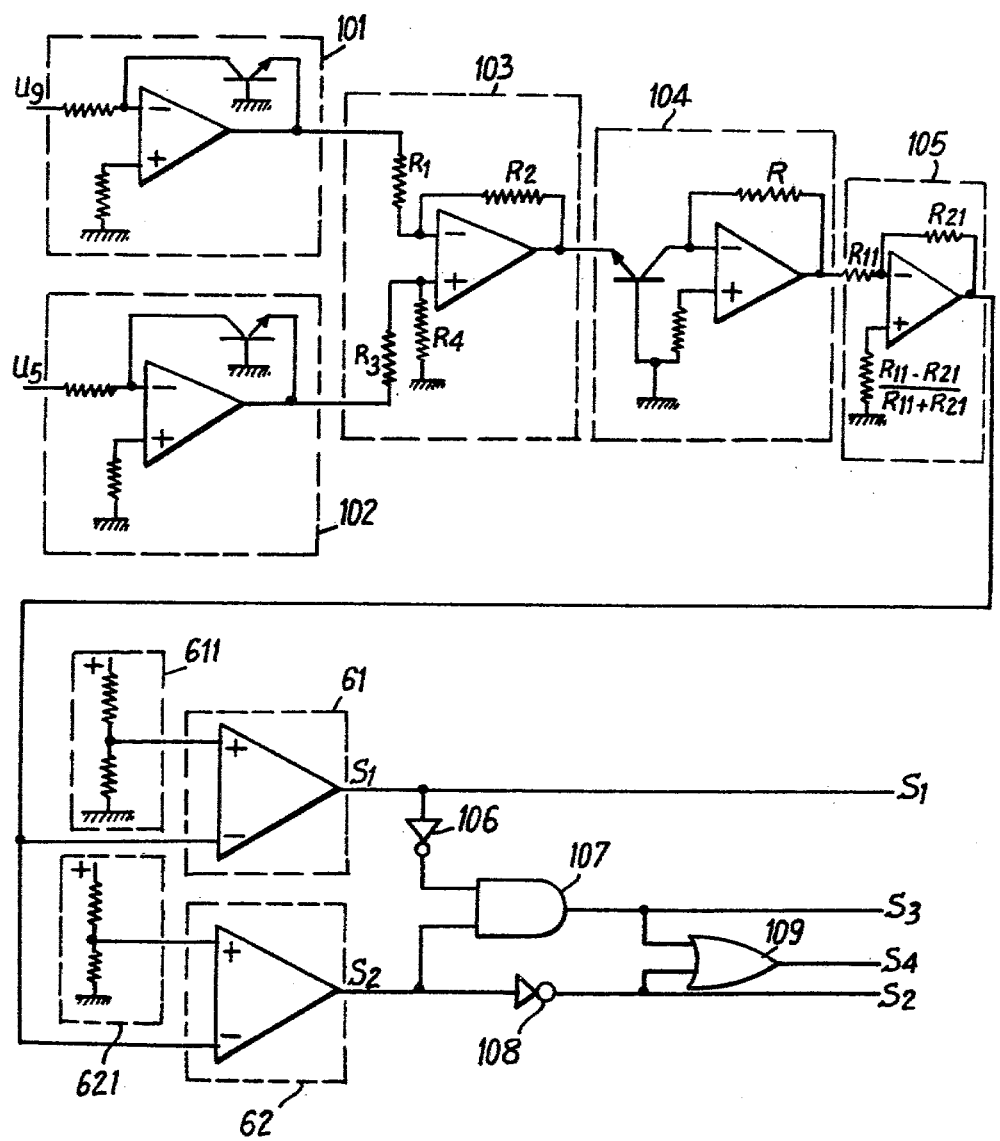
Figure 12:
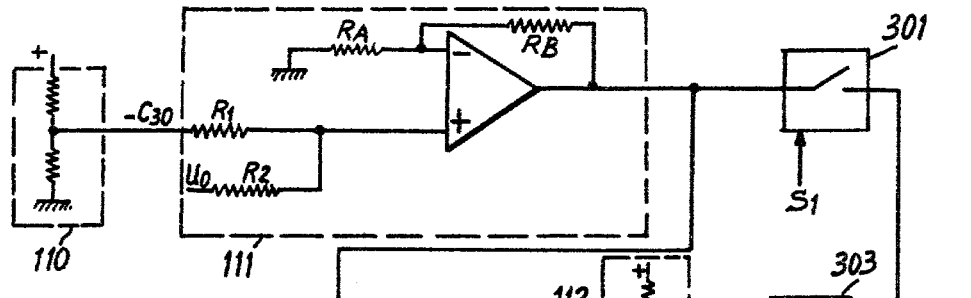
Figure 13:
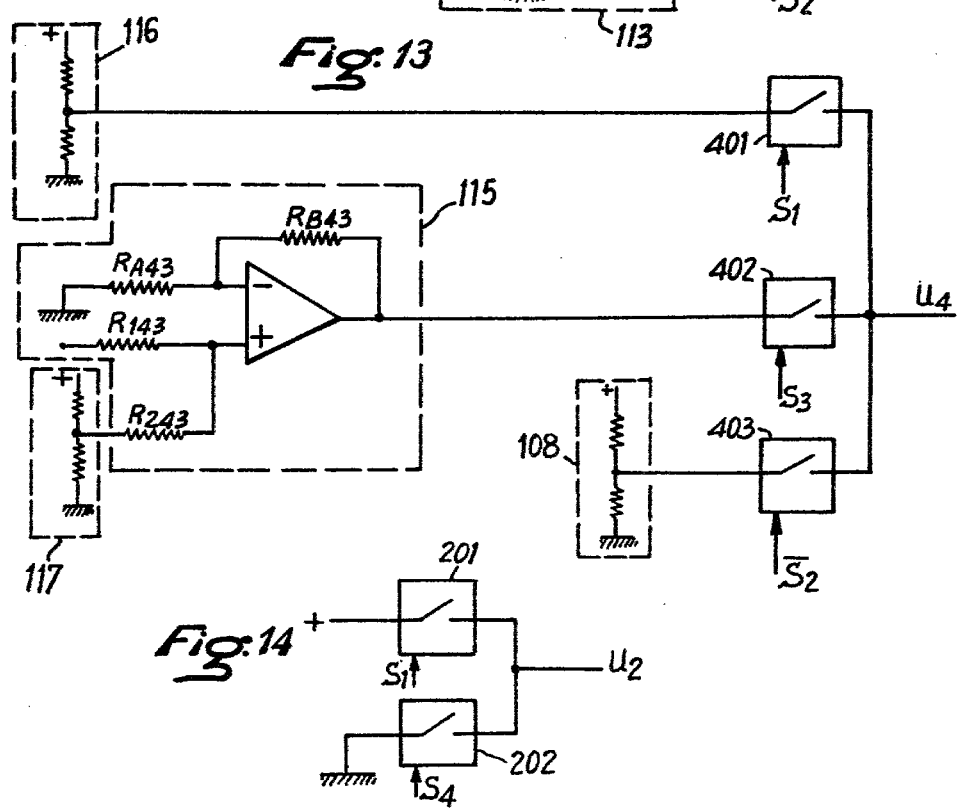
Figure 14:
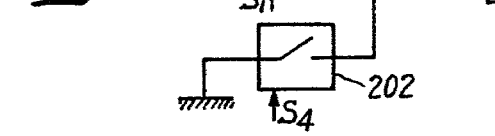

FIG. 3 is a schematic presentation of the logical control unit 70 defined in U.S. Pat. No. 4,064,694 showing its inputs and outputs;

FIG. 4 is a schematic presentation of a part of the system for correcting the hydraulic pressure of the conventional braking system;

FIG. 5 is a schematic presentation of the common and special inputs and outputs, of the logical units 80 and 90 which are further defined in details in other Figures;

FIG. 6 is a circuit diagram showing the connection of the common inputs and outputs of the logical units 80 and FIG. 7 is a presentation of the mechanical portion of the actuating device;

FIG. 8 is a schematic presentation of a first part of the logical unit 80 generating control signals of the hydraulic motors 3, 4 and of the coupling clutch 2;

FIG. 9 is a schematic presentation of a second part of the logical unit 80 generating intermediate signals;

FIG. 10 is a schematic presentation of a third part of the logical unit 80 generating control signals of the braking correcting system;

FIG. 11 is a schematic presentation of a first part of the logical unit 90 producing intermediate signals;

FIG. 12 is a schematic presentation of a second part of the logical unit 90 producing a control signal for one of the hydraulic motors;

FIG. 13 is a schematic presentation of a third part of the logical unit 90 producing a control signal for the other hydraulic motor;

FIG. 14 is a schematic presentation of a fourth part of the logical unit 90 producing a control signal for the coupling clutch.

Figure 1:
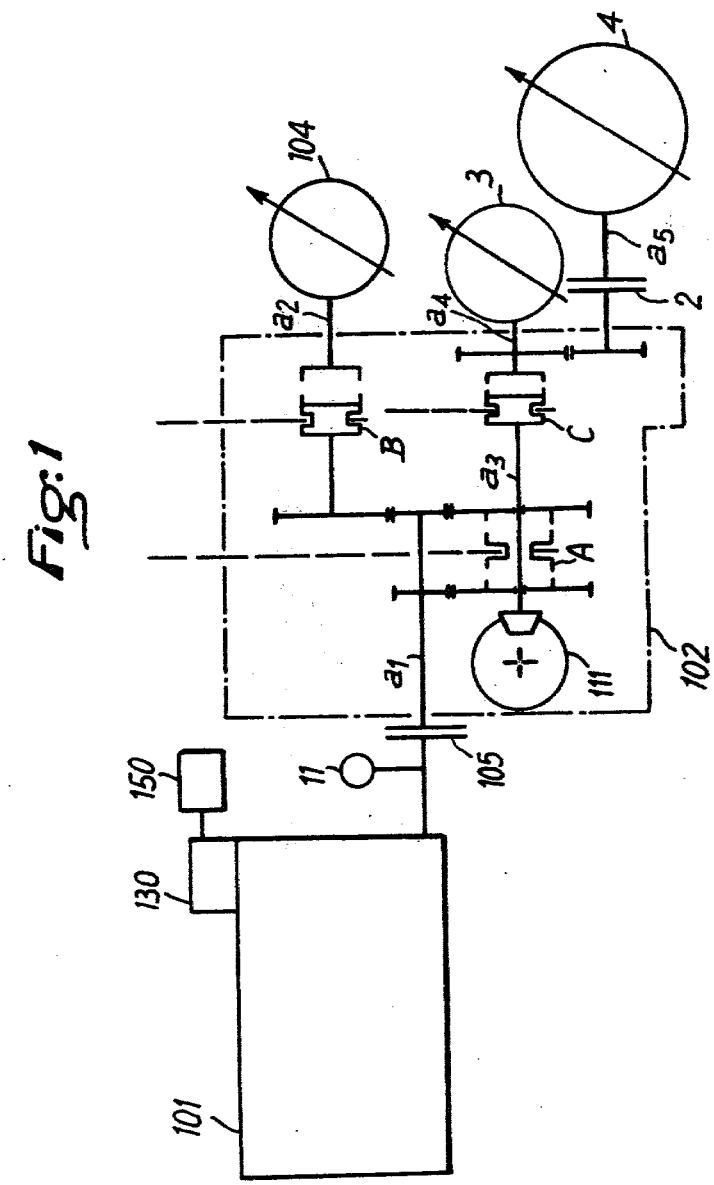
FIG. 1 is a schematic presentation of the mechanical portion of the transmission system.

As shown in FIG. 1, a heat engine or internal combustion engine 101 equipped with an ignition coil 130, a relay 150 for supplying or cutting out the latter electrically and a speed transducer 11 drives the primary shaft a1 of a gearbox transmission unit 102 through a clutch 105. The primary shaft a1 drives either the third-motion shaft a2 which is associated with a reversible, variable displacement hydraulic motor/pump 104 or a first output shaft a3 which is associated with the differential 111 and with the driving wheels of the vehicle.

There are two modes of operation: the driver selects either one mode or the other and indicates his choice by means of a mode-selecting lever which will be described below and which also serves as a gear shift lever in the second or so-called highway mode of travel.

In the first mode or so-called city traffic mode of travel, the shafts a1 and a2 are coupled together by means of a positive-clutch system B. The output shaft a3 and a second output shaft a4 of a reversible, variable displacement hydraulic motor 3 are coupled together by means of a positive-clutch system C. A third output shaft a5 of a second reversible, variable displacement hydraulic motor 4 is driven if the clutch 2 is actuated under the control of the regulating unit which will be described below.

In the second mode or so-called highway mode of travel, the transmission torque between the shafts a1 and a2 and between the shafts a3 and a4 is interrupted by positive clutch systems B and C, each being disengaged. The shafts a1 and a3 are coupled together through the intermediary of the positive-clutch system A as long as the driver indicates a speed ratio by means of the mode & selecting lever.

(a) Regulating unit

Figure 2:
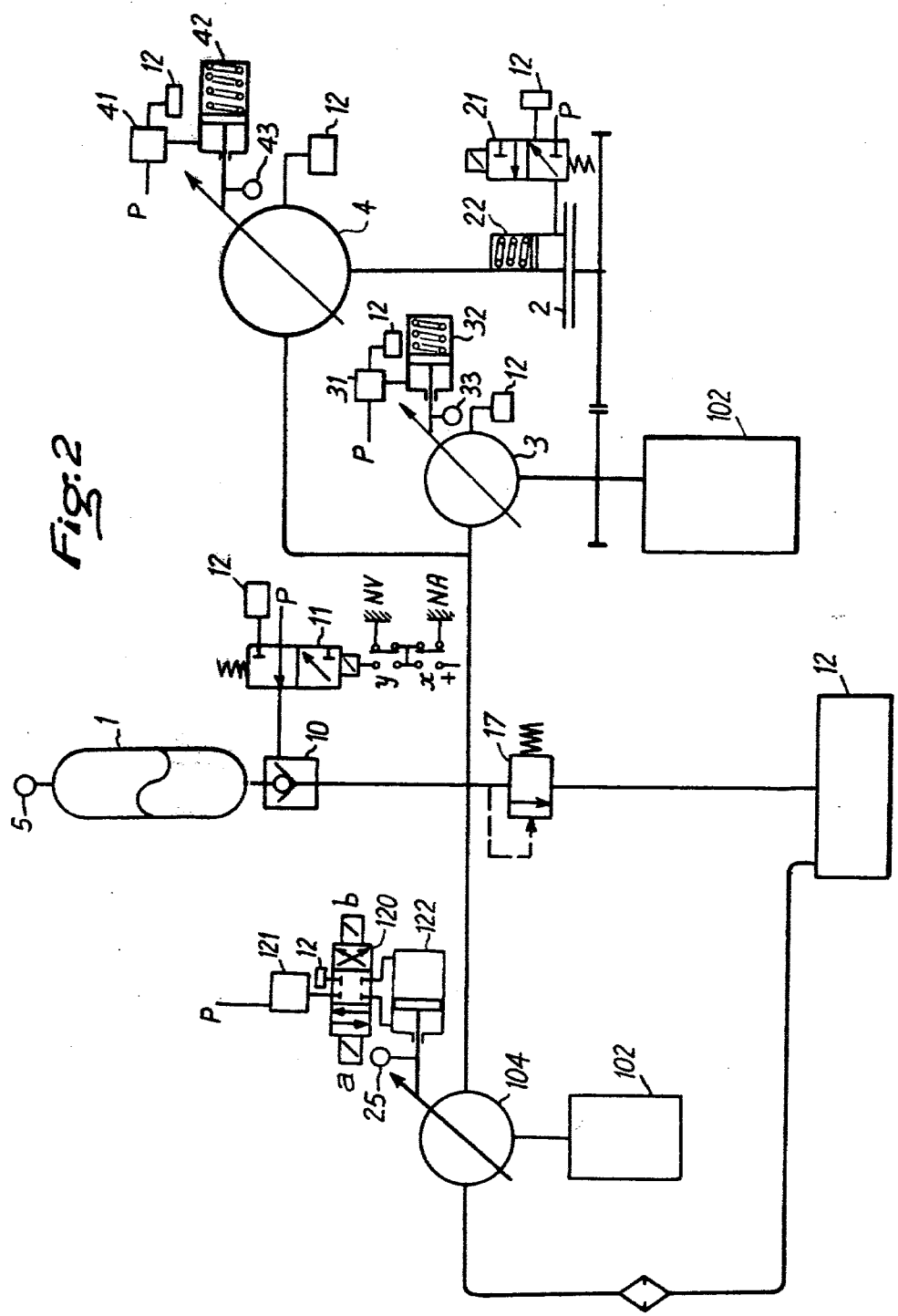
FIG. 2 is a schematic presentation of the hydraulic portion of the transmission system and of the transmission control devices.

In the city traffic mode, the operation of the engine 101 is controlled by the state of pressure of an oleopneumatic accumulator 1 as illustrated in FIG. 2.

When this accumulator pressure falls below a reference value P1, the voltage supplied to the ignition system is restored, and the engine 101 is started-up by means of the reversible hydroulic motor/pump 104 operating as a motor which is supplied by the accumulator 1. When the pressure becomes higher than a reference value P2, the engine is stopped by cutting off either the ignition or the fuel supply. Mode selection of the reversible motor/pump 104 is controlled by means of a jack 122 and a 3-position electrovalve 120 which is supplied by an electrically-operated flow-control valve 121. The logical system for cutting-off or restoring the ignition or the means for supplying the engine 101 is provided by a regulating unit 70 described in details in U.S. Pat. No. 4,064,964 of the Applicant and which is here only shown diagrammatically in FIG. 3 wherein:

The inputs to unit 70 are:
  a voltage u5 which is delivered by a transducer 5 and is proportional to the pressure which exists within the accumulator 1;
  a voltage u11 which is delivered by a transducer 11 and is proportional to the speed of rotation of the engine 101;
  a voltage u25 which is delivered by a transducer 25 and is proportional to the cylinder capacity of the pump 104 to within the nearest constant.

The outputs of the unit 70 are the control voltages of the electromagnets a and b of the electrovalve 120 and of the flow-control valve 121 and the control voltage of the relay 150.

Furthermore, the coil of the engine is here continuously supplied in the highway mode by means of a relay which is closed when the control unit 200 (described below) is not in the city traffic position, and which may be the relay 150 itself.

In the city traffic mode, the reversible hydroulic pump/motors 3 and/or 4 are supplied by the accumulator 1 and/or the pump 104 (as shown in FIG. 2). The regulating operation hereinafter described ensures control of the mode selection of the motors 3 and 4 by means of the two jacks 32 and 42 which are supplies by pressure-type electro-valves 31 and 41 as well as by the operation of the clutch 2 by means of the jack 22 which is controlled by the two-position distributor 21. This control operation is performed as a function of the actions of the driver on the accelerator and brake pedals and on the mode-selecting lever.

As shown in FIG. 2, the valve 10 which is controlled by an electrovalve 11 prevents draining of the accumulator 1 when said electrovalve is not supplied with current. It will be noted that the electrovalve 11 is supplied with current when the driver accelerates the vehicle (the switch x being closed), whilst at the same time the mode-selecting lever is in the city traffic mode (the switch y being closed).

As illustrated in FIG. 2, a pressure-limiting valve 17 which is calibrated at a pressure of higher value than the maximum utilization pressure of the accumulator 1 protects the system against any possible pressure overshoots.

The regulating operation also ensures that brake application is solely a function of the effort exerted by the driver on the brake pedal 6, shown in FIG. 4, and that said brake application permits maximum recovery. In fact, the motors 3 and 4 are capable of operating as pumps during braking for partial recovery of the kinetic or potential energies of the moving vehicle.

Depending on whether the motors 3 and 4 operate as pumps or as motors, the regulating operation modifies the pressure which prevails within the master cylinder of the main braking circuit of the vehicle by means of the pressure-type electrovalve 64, the three-position electrovalve 65 and the double-acting jack 63, the piston rod of which is connected to the brake pedal 6 (see FIG. 4). A sensor 7 for detecting the braking effort F exerted by the driver of the vehicle on the brake pedal 8 delivers a voltage u7 proportional to this effort, the brake pedal being operatively connected to the piston of the master cylinder (not shown) of the conventional brake circuit of the vehicle. In addition, the pedal 6 comprises a switch 66 adapted to be closed when the driver depresses the pedal. The solenoid-operated valve 31 delivers a pressure P3 proportional to its supply voltage u3, this pressure being exerted on the piston of a cylinder 32 responsive to an antagonistic spring so that the movement d3 of the piston is proportional to this pressure.

The cylinder capacity of the first hydraulic motor 3 in a state of equilibrium may be written as follows:

$$-C_3 = C_{30} + \alpha d_3$$

$$-C_3 = C_{30} + \beta P_3$$

$$-C_3 = C_{30} + \gamma u_3$$

wherein $\alpha$, $\beta$ and $\gamma$ are proportionality constants and $C_{30}$, a negative quantity, corresponds to the minimal cylinder capacity of the motor 3 operating as a pump.

Similar equations are obtained in the case of motor 4, such as:

$$C_4 = C_{40} + \delta u_4$$

wherein $\delta$ is a constant and $C_{40}$ a negative quantity corresponding to the minimal cylinder capacity of the motor 4 operating as a pump. The solenoid valve 41 delivers a pressure P4 proportional to its supply voltage u4, this pressure being exerted on the piston of a cylinder 42 responsive to an antagonistic spring so that the movement d4 of this piston be proportional to said pressure.

A pair of sensors 33 and 43 deliver voltages u33 and u43, respectively, which are proportional to the actual cylinder capacities of motors 3 and 4, respectively.

The solenoid valve 21, when energized, sets the piston 22 under pressure, thus releasing the clutch 2.

A logic block 80 controlling the operation of the complete device as a function of the braking effort exerted by the driver on the brake pedal 6 has its inputs connected:

to the pressure sensor 5 delivering a voltage $u_5$ proportional to the pressure existing within the hydropneumatic accumulator 1, to the sensor 7 detecting the braking effort and delivering a voltage $u_7$ proportional to the effort exerted by the driver on the pedal 6, to the sensors 33 and 43 delivering voltages $u_{33}$ and $u_{43}$, respectively, proportional to the actual cylinder capacities of motors 3 and 4, respectively, The logic block 80 has its outputs connected:

to the "pressure" type solenoid valves 31 and 41 in order to deliver corresponding voltages $u_3$ and $u_4$ thereto, and thus modify the corresponding cylinder capacities of motors 3 and 4, to the solenoid valve 21, in order to deliver thereto a voltage $u_2$ for controlling the release of clutch 2, to the "pressure" type solenoid valve 64 in order to deliver a control voltage $u_{64}$ for determining the supply pressure, to the coils controlling the operation of the solenoid valve 65 in order to deliver a feed voltage $u_{65a}$; $u_{65b}$ thereto.

What is desired is a braking system such that the total braking effort F exerted on the vehicle, which is the algebraic sum of the braking effort $F_1$ due to the conventional brakes of the vehicle and of the algebraic braking effort $F_2$ produced by the hydraulic motors, be proportional to the effort exerted by the driver on the brake pedal 6; in other words, it is desired that: $F=F_1+F_2=a \cdot f$, wherein a is a constant; now $F_1=bP_1$, wherein $P_1$ is the pressure exerted on the piston of the master cylinder of the braking system.

$F_2=-d \cdot P_a (C_3+qC_4)$, wherein $P_a$ is the pressure within the accumulator 1 and $C_3$ and $C_4$ are the cylinder capacities of motors 3 and 4, respectively. A hydraulic braking action is obtained only when $C_3+qC_4<0$. Consequently, one may write:

$$-af=bP_1-dP_a(C_3+qC_4), \text{ i.e.:}$$

$$-bP_1=af+dP_a(C_3+qC_4),$$

or alternatively:

$$-eP_1=f+dP_a(C_3+qC_4),$$

wherein e is a constant. This relationship is obtained through the logic block 80 which will be described presently with reference to FIGS. 8 to 10.

Thus, for a given effort exerted by the driver on the brake pedal 6 and corresponding to the desire to obtain a predetermined total braking force produced on the vehicle, the pressure generated in the master cylinder increases with the output torque delivered by the hydraulic motors 3 and 4 and decreases as the braking torque generated by the motors increases.

At the beginning of the brake application, if the driver has just released the accelerator pedal the hydraulic motors 3 and 4 are still driving motors, thus increasing the pressure in the master cylinder. As these motors gradually operate as braking means, the pressure drops in the master cylinder until it is cancelled completely, thus causing the braking action to become completely regenerative.

During the brake application, the regulation means monitor the cylinder capacity of motors 3 and 4 in order to render the braking action as regenerative as possible without detrimentally affecting its efficiency.

When during the brake application $F_1=0$, the braking action is purely regenerative.

It will be seen that:

(1) The total braking effort is only subordinate to the effort exerted by the driver on the brake pedal 6, (2) The period elapsing before the decleration occurs is the same as in a conventional vehicle, (3) The regulation according to the instant invention constantly tends to optimize the recovered energy.

At the beginning of a brake application, the latter is obtained integrally through the conventional braking system of the vehicle. Then, as the cylinder capacities of the hydraulic motors 3 and 4 decrease and become gradually more negative by operating as pumping means, the regenerative braking effort increases and the regulation reduces the pressure in the main braking circuit. When "reasonable" braking efforts are exerted on the brake pedal 6, the braking action becomes purely regnerative.

Let $C_{30}$ and $C_{40}$ be the minimal, negative cylinder capacities of hydraulic motors 3 and 4, the following mode of operation must be provided for by the regulation means.

(1) When $-C_{30} \geq f/\lambda P_a$, one takes $C_3=-f/\lambda P_a$ and $C_4=0$. The braking action becomes a purely regenerative one.

(2) When $-qC_{40} \geq f/\lambda P_a > -C_{30}$, one takes $C_3=0$ and $C_4=-f/\lambda qP_a$, the braking action becomes a purely regenerative one.

(3) When $-C_{30}-qC_{40} \geq f/\lambda P_a > -qC_{40}$, one takes $C_3=-f/\lambda P_a-qC_{40}$ and $C_4=C_{40}$, the braking action becomes a purely regenerative one.

(4) When $f/\lambda P_a > -C_{30}-qC_{40}$, one takes $C_3=C_{30}$ and $C_4=C_{40}$, the braking system is both regenerative and dissipative.

Sensors 5 and 7 deliver the following voltages:

$u_7=lf$ with $l=$ constant, $u_5=mP_a$, with $m=$ constant, therefore: $f/\lambda P_a = m/l\lambda \cdot u_7/u_5$ Moreover:

$C_3=C_{30}+\gamma u_3$ in the state of equilibrium, $C_4=C_{40}+\delta u_4$ in the state of equilibrium.

Therefore, the logic block 80 controlling the cylinder capacities of motors 3 and 4 and of clutch 2 should deliver the following set of signals:

When $-C_{30} \geq \dfrac{m}{l} \cdot \dfrac{u_7}{u_5}$ \hfill (1)

$$u_2 = U$$

$$u_3 = \frac{-C_{30}}{\gamma} - \frac{m}{\gamma l \lambda} \cdot \frac{u_7}{u_5}$$

$$u_4 = -\frac{C_{40}}{\delta}$$

When $-qC_{40} \geq \dfrac{m}{l\lambda} \cdot \dfrac{u_7}{u_5} > -C_{30}$ \hfill (2)

-continued $$u_2 = 0$$

$$u_3 = \frac{-C_{30}}{\gamma}$$

$$u_4 = \frac{-C_{40}}{\gamma} - \frac{m}{\delta\lambda ql} \cdot \frac{u_7}{u_5}$$

When $-C_{30} - qC_{40} \geq \frac{m}{1\lambda} \cdot \frac{u_7}{u_5} > -qC_{40}$ (3)

$$u_2 = 0$$

$$u_3 = \frac{-qC_{40} - C_{30}}{\gamma}$$

$$-\frac{m}{\gamma\lambda l} \cdot \frac{u_7}{u_5}$$

$$u_4 = 0$$

When $-C_{30} - qC_{40} < \frac{m}{1\lambda} \cdot \frac{u_7}{u_5}$ (4)

$$u_2 = 0$$

$$u_3 = 0$$

$$u_4 = 0$$

Moreover, the aforesaid logic 80 must also ensure the creation of a precalculated adequate pressure on one of the faces of the piston of cylinder 63.

It is admitted that sensors 33 and 43 will deliver the following algebraic voltages:

$$u_{33} = sC_3$$

$$u_{43} = tC_4$$

in which s and t are constants.
Thus, $C_3 + qC_4 = (l/s)\cdot u_{33} + (q/t)\cdot u_{43}$. One selects: $(l/s) = q/t$. Consequently, $C_3 + qC_4 = (l/s)(u_{33} + u_{43})$.

The pressure $P_2$ delivered by solenoid valve 64 is written: $P_2 = \mu \cdot u_6$, wherein $\mu$ is a constant.

It is necessary that $u_{64} = (k/\mu ms) \cdot u_5 |(u_{33} + u_{43})|$ and that $$u_{65} = 0 \text{ when } u_{33} + u_{43} > 0$$

$$u_{65} = U \text{ when } u_{33} + u_{43} > 0.$$

It is ascertained that the maximal value of $u_7$ is lower than the maximum value of $u_5$. This leads to a circuit simplification. Thus, $u_5/u_7$ is constantly greater than one and its neperian logarithm is greater than zero.

Now the construction of the logic control block 80 will be described with reference to FIGS. 8 to 10.

In FIG. 8, a pair of identical logarithimic converters 601 and 602 are connected via a resistor at their minus input to sensors 7 and 5, respectively, of FIG. 1, for receiving the voltages $u_7$ and $u_5$, respectively. Each logarithmic converter has its plus input grounded and incorporates in its reaction path the emitter to collector gap of a transistor having its base grounded.

If K is the Boltzmann constant, T the absolute temperature, q the electron charge and $I_s$ the reverse emitter to base current of the transistor incorporated in the reaction path, the output signals of these two logarithmic converters will be respectively:

for converter 601: $(KT/q)\cdot\log(u_7/RI_s)$
for converter 602: $(KT/q)\cdot\log(u_5/RI_s)$ The outputs of these two logarithmic converters are connected via resistors $R_1$ and $R_3$ to the minus and plus inputs of a differential amplifier 603 having its input grounded via a resistor $R_4$ and comprising a resistor $R_2$ in its reaction path. These resistors are so selected that $$R_1/R_2 = R_3/R_4.$$

when $R_1 = R_2$, the output signal is equal to:

$$(R_2/R_1)\cdot(KT/q)\cdot\log(u_5/u_7) = -(KT/q)\cdot\log(u_5/u_7).$$

The output of the differential amplifier 603 is connected to the minus input of an anti-logarithmic amplifier-converter 604 through the medium of the emitter to collector gap of a transistor having its base grounded. The positive input of amplifier 604 is also grounded and incorporates a resistor R in its reaction path. It will be noted that the input signal:

$(KT/q)\cdot\log(u_5/u_7)$ a negative when $u_5 > u_7$.

Assuming now that $u_5$ varies from $u_{51}$ to $u_{52}$, that $u_7$ varies from 0 to $u_7$ max; one selects $u_7$ max $< u_{51}$. Thus, we constantly have $u_5/u_7 > 1$.

Under these conditions, the output signal of the anti-logarithmic amplifier converter 604 is $-RI_5\cdot(u_7/u_5)$.

The output of the anti-logarithmic amplifier converter 604 is connected to the negative input of an inverter amplifier 605 via a resistor $R_{10}$. The reaction path of the amplifier incorporates a resistor $R_{20}$ and the positive input is grounded via a resistor having a value $(R_{10}\cdot R_{20})/(R_{10}+R_{20})$. Under these conditions, the output signal of the inverter amplifier 605 is equal to:

$$(R_{20}/R_{10})\cdot RI_s\cdot(u_7/u_5)$$

The values of the resistors are so selected that $$(R_{20}/R_{10})\cdot RI_s = m/l\lambda$$

Thus, the sequence of circuits leading from 601 to 605 will deliver from $u_5$ and $u_7$ the voltage $$(m/l\lambda)\cdot(u_7/u_5) = u_0$$

The output of the inverter amplifier 605 is connected in paralel to the negative inputs of three comparators 601, 611 and 612 having their positive inputs connected to the central point of a voltage divider 620, 621, 622 delivering the following reference voltages, respectively:

620 → $-C_{30}$
621 → $-q C_{40}$
622 → $-C_{30} - q C_{40}$

The control voltages of analogue switches 631 to 634 for generating the voltage $u_3$, 641 to 643 for generating the voltage $u_4$, and 621, 622 for generating voltage $u_2$, are calculated from the output signals of comparators 610, 611, 612, possibly modified with the assistance of inverters 650 to 652 and possibly also combined with the assistance of AND gates 653 and 654 and/or OR gates 655 and 656. The control signal of the analogue switch 631 is delivered by the output of comparator 610; the signal controlling the analogue switch 632 is the combination, in the AND gate 653, of the output signal of comparator 611 with the output signal of comparator 610, inverted by inverter 650.

The signal controlling the analogue switch 633 in the combination, in the AND gate 654, of the output signal of comparator 612 with the output signal of comparator 611, inverted by inverter 651. The signal controlling the analogue switch 634 is the output signal of comparator 612 inverted by inverter 652.

The signal controlling the analogue switches 641, 631 and 621 is equal to the output signal of comparator 610. The signal controlling the analogue switch 642 is the same as the signal controlling the analogue switch 632. The signal controlling the analogue switch 643 results from the passage through OR gate 655 of the signal produced at the output of AND gate 654 and also of the output signal of comparator 612, inverted by inverter 652. Finally, the signal controlling the analogue switch 622 results from the passage through OR gate 656 of the output signal of OR gate 655 and also of the output signal of AND gate 653. Two voltage dividers 659 and 657 deliver positve voltages $-C_{30}/\gamma$ and $-C_{40}/\delta$ constituting the inputs of analogue switches 632 and 641.

The inputs A, B and C of analogue switches 631, 642 and 633 are fed from the circuit of FIG. 9 to be described hereinafter. The inputs of analogue switches 634, 643 and 622 are grounded and the input of analogue switch 621 is connected to the positive or + terminal of the storage battery.

FIG. 9 illustrates three differential amplifiers 660, 670 and 680 delivering at their outputs the voltages A, B and C, respectively, required for constituting the inputs of the analogue switches 631, 642 and 633 of FIG. 8. The negative terminals of these three differential amplifiers 660, 670 and 680 are connected in parallel to the output of the inverter amplifier 605 delivering the aforesaid voltage $u_0$ via a resistor $R_{100}$ for the first and third differential amplifiers 660, 680 and a resistor $R_{101}$ for the second differential amplifier 670. The positive terminal of these three differential amplifiers is connected to the middle point of voltage divider 620 delivering the voltage $-C_{30}$ for the first differential amplifier, via a resistor $R_{100}$; to the middle point of another voltage divider 671 delivering the voltage $-q(C_{40}/\delta)$ for the second differential amplifier, via a resistor $R_{101}$, and finally to the middle point of voltage divider 622 delivering the voltage $-q\,C_{40}-C_{30}$ for the third differential amplifier, via a resistor $R_{100}$. The positive terminal of differential amplifiers 660 and 680 is grounded through a resistor $R_{200}$ and a resistor of same value is inserted into their reaction path. The positive terminal of differential amplifier 670 is grounded through the medium of another resistor $R_{210}$ and a resistor of same value is inserted into reaction path of the amplifier.

If we select:

$R_{200}/R_{100}=1/\gamma$ and $R_{201}/R_{101}=1/q$.

the output signals of the three differential amplifiers will be:

amplifier 660: $A = \frac{1}{\gamma}(-C_{30} - 40)$ amplifier 670: $B = \frac{1}{q}(-\frac{q}{\delta}C_{40} - 40)$ amplifier 680: $C = \frac{1}{\gamma}(-qC_{40} - C_{30} - 40)$ The second portion of the logic control block 80 which generates the voltages $u_{64}$ and $u_{65a}$, $_{65b}$ exerting a direct influence on the braking conditions will now be discussed with reference to FIG. 10 completed by FIG. 4.

The corresponding circuits comprise firstly an adder-inverter 681 having its negative input connected in parallel to sensors 33 and 43 so as to receive the voltages $u_{33}$ and $u_{43}$ via resistors $R_{33}$ and $R_{43}$, respectively. The positive terminal of the adder-inverter is grounded through a resistor $R=R_{33}//R_{43}$ and the reaction path comprises a resistor $R_{33}$. The output of adder-inverter 681 is connected to the negative input of a comparator 682 having its positive input grounded. The output signal of the adder-inverter 681 is equal to $-u_{33}-qu_{43}$.

As shown in FIG. 4, the output of the comparator 682 of the unit 80 supplies the control electrode of a first analog switch 683 and, through a reversing switch 684, the control electrode of a second analog switch 685 and that of a third analog switch 683'; and the control electrode of a fourth analog switch 685'.

Thus, for $u_{33}+qu_{43}>0 \rightarrow u_{65a}=0$ for $u_{33}+qu_{43}<0 \rightarrow u_{65a}=U$ and conversely for $u_{65b}$.

The output of adder-inverter 681 is furthermore connected in parallel to the negative input of an inverter amplifier. The outputs of the inverter amplifier and of the non-inverter amplifier are connected in parallel by means of diodes and grounded resistors to the positive input of an adder amplifier. The sub-assembly 686 comprising the inverter amplifier, the non-inverter amplifier and the adder-amplifier just described hereinabove delivers an absolute value of $u_{33}+qu_{43}$. This absolute value constitutes the input signal of a logarithmic converter 687 as already mentioned in the foregoing with reference to FIG. 8. Therefore the output signal has the following configuration:

$$-\frac{KT}{q}\log\frac{|u_{33}+qu_{43}|}{RI_s}$$

In parallel with this logarithmic converter 687 is a second logarithmic converter 688 of which the input voltage consists of signal $u_5$, so that the output signal has the shape:

$-(KT/q)\cdot\log(u_5/RI_s)$, in which $RI_s$ is selected to be equal to one.

The outputs of both logarithmic converters 687 and 688 are connected in parallel to the negative input of the adder inverter 689 via resistor $R_1$. The positive input of this adder inverter is grounded via a resistor $R//R_1$ and a similar resistor is found in the reaction path. Under these conditions, the output signal of the adder inverter 689 is equal to:

$(KT/q)\cdot\log(|u_{33}+qu_{43}|\cdot u_5)$.

This voltage is found again at the input of an anti-logarithmic converter 690 having the composition already mentioned with reference to FIG. 8. The output signal of this anti-logarithmic converter 690 is equal to:

$-u_5|u_{33}+qu_{43}|$

This voltage is delivered to the negative input of an inverter amplifier 691 via a resistor $R_{101}$. A resistor $R_{201}$ is inserted into the reaction path of this amplifier of which on the other hand the positive input is grounded through the medium of a resistor $(R_{101} \cdot R_{201})/(R_{101}+R_{201})$. The output voltage of the inverter amplifier 691 is written as follows:

$$(R_{201}/R_{101}) \cdot u_5 |u_{33}+qu_{43}|$$

$R_{201}$ and $R_{101}$ are so selected that: $R_{201}/R_{101}=k/\mu ms$
Finally, we have:
- $u_{64}=0$ when the driver does not apply the brakes,
- $u_{64}=(k/\mu ms) \cdot u_5 |u_{33}+qu_{43}|$ when the driver applies the brakes, which is the desired result.

It is also apparent in FIG. 4 that correction takes place only when the driver applies the brakes while the vehicle is in the city traffic forward motion mode. The switches 301 and 301' and the switches 302 and 302' are in fact in the position indicated in FIG. 4 in which the driver does not apply the brakes (NF) and in which the selected mode is not the first forward-motion mode (NAVV).

The operator controls the torque he desires by way of a suitable member, for example the acceleration pedal 8 of the vehicle, to which is connected a position pick up 9 transmitting a voltage $u_9$ proportional to the torque in the wheel desired by the operator to a logic block 90. The logic block 90 is also connected to the pick up 5 which transmits to it a voltage $u_5$ proportional to the pressure $P_a$ prevailing in the accumulator 1.

The logic block 90 is also connected via outputs to electrovalves 21, 31 and 41. As already mentioned: $C_3 = C_{30} + \gamma u_3$ with $C_{30}$ negative corresponding to the minimum volumetric displacement of the engine 3 acting as pump and $u_3$ being the voltage supplied by the logic block 90 to the electrovalve 31. $\gamma$ is a constant. $C_{31}$ designates the maximum volumetric displacement of the engine 3. Similarly one has:

$$C_4 = C_{40} + \delta u_4$$

with $C_{40}$ negative corresponding to the minimum volumetric displacement of the engine 4 acting as pump and $u_4$ being the voltage supplied by the logic block 90 to the electrovalve 41. $\delta$ is a constant. $C_{41}$ denotes the maximum volumetric displacement of the engine 4. The electrovalves 21, 31, 41 like the hydraulic engines 3 and 4, are connected to a tank 12. The regulation is designed to ensure the cutting out of the larger of the engines 4 by opening the coupling 2 when the small engine 3 is sufficient to supply the torque required by the operator taking into account the pressure in the accumulator 1 at the moment in question.

The base equation of the system which is the sum of the hydraulic torques developed by the engines 3 and 4 is in the form:
$$\epsilon P_a(C_3 + \beta C_4)$$

$\epsilon$ being a constant and $\beta$ being a constant.

This quantity should, on balance, be equal to the torque required by the operator which is itself proportional to the displacement d of the control member, here the acceleration pedal 8 of the hybrid motor vehicle. Thus one should have:

$$d = \psi P_a(C_3 + \beta C_4)$$

or:

$$C_3 + \beta C_4 = d/\psi P_a$$

The same total torque can be obtained for various combinations of the volumetric displacements of the engines 3 and 4.

To optimalize the output the following choices are made:

(1) if $(d/\psi \cdot P_a) \leq C_{31}$,
one chooses $C_3 = (d/\psi \cdot P_a)$ and $C_4 = 0$
the required torque is only supplied by the small engine 3, the coupling 2 is open.

(2) if $C_{31} < d/\psi \cdot P_a \leq \beta C_{41}$,
one chooses $C_3 = 0$ and $C_4 = d/\beta \psi P_a$
the torque is only supplied by the large engine 4, the coupling 2 is closed.

(3) if $\beta \cdot C_{41} < d/\psi P_a < C_{31} + \beta C_{41}$
one chooses $C_4 = C_{41}$ and $C_3 = (d/\psi P_a) - \beta C_{41}$
the torque is supplied by the two engines, the larger 4 operating at maximum volumetric displacement, the coupling 2 is closed.

Taking into account the relations:

$u_5 = mP_a$   m is a constant $u_g = nd$   n is a constant the preceding equations become:

(1) if $(m/\psi n) \cdot (u_g/u_5) \leq C_{31}$, one chooses:

$$u_2 = U \quad U_4 = -\frac{C_{40}}{\delta}$$

$$u_3 = \frac{1}{\gamma} \left( \frac{m}{\psi n} \cdot \frac{u_g}{u_5} - C_{30} \right)$$

(2) if $C_{31} < (m/\psi n) \cdot (u_g/u_5) \leq \beta C_{41}$, one chooses:

$$u_2 = O \quad U_3 = -\frac{C_{30}}{\gamma}$$

$$u_4 = \frac{1}{\beta \delta} \left( \frac{m}{\psi n} \cdot \frac{u_g}{u_5} - \beta C_{40} \right)$$

(3) if $\beta C_{41} \leq (m/\psi n) \cdot (u_g/u_5)$, one chooses:

$$u_2 = O \quad U_4 = \frac{1}{\delta}(C_{41} - C_{40})$$

$$u_3 = \frac{1}{\gamma} \left( \frac{m}{\psi n} \cdot \frac{u_g}{u_5} - C_{30} - \beta C_{41} \right)$$

One mode of realisation of the logic block 90 allowing these results to be obtained will now be described.

In FIG. 11 a logarithmic converter 101 is connected through its negative input to the pick up 9 to receive the voltage $u_9$. It is grounded through its positive input and has the emitter-receiver space of a transistor in its feedback path. In analogous manner a second logarithmic converter 102 identical to the first 101 is connected through its negative input to the pick up 5 to receive the voltage $u_5$. The logarithmic converters 101 and 102 are connected through their outputs respectively to the negative and positive inputs of a differential amplifier 103 by way of resistances $R_1$ and $R_3$ respectively, this amplifier having a resistance $R_2$ in its feedback path and also having its positive input grounded by way of a resistance $R_4$ with $R_1/R_2 = R_3/R_4$ and $R_1 = R_2$.

The output of the differential amplifier 103 is connected to the input of an antilogarithmic converter 104 having the emitter-receiver space of a transistor connected to its negative input, the base of the transistor being grounded as well as the positive input of the converter by way of a resistance. A resistance R is disposed in the feedback path of the converter 104. The output of the antilogarithmic converter 104 is connected to the negative input of an inverter amplifier 105 by way of a resistance $R_{11}$. The inverter amplifier 105 has a resistance $R_{21}$ in its feedback path and its positive input is grounded by way of a resistance of the value:

$$(R_{11} \cdot R_{21})/(R_{11}+R_{21})$$

The output of the inverter amplifier 105 is connected in parallel to the negative inputs of two comparators 61 and 62. The positive input of the comparator 61 is connected to the central point of a potential divider 611 supplying a voltage corresponding to the maximum volumetric displacement $C_{31}$ of the engine 3 and the positive input of the comparator 62 is connected to the central point of another potential divider 621 supplying a voltage corresponding to $9C_{41}$ wherein $C_{41}$ is the maximum volumetric displacement of the engine 4. The comparator 61 supplies an output signal $S_2$ which is one or zero depending on the case.

An AND-gate 107 is connected through one input to the output $S_2$ and through its second input to the output $S_1$ by way of an inverter 106. The output of the AND-gate 107 which supplies a signal $S_3$ is moreover connected to one input of an OR-gate 109 connected through its second input to the output $S_2$ of the comparator 62 by way of an inverter 108 supplying an output signal $\overline{S}_2$. The OR-gate 109 supplies a signal $S_4$ at its output.

In FIG. 12, a non-inverting summating amplifier 111 is connected through its positive input on the one hand to the center of a potential divider 110 allowing the positive voltage $-C_{30}$ to be obtained by way of a resistance $R_1$, on the other hand to a voltage $u_0$ by way of a resistance $R_2$. The negative input of the amplifier 111 is grounded by way of a resistance $R_A$ and the feedback path of the amplifier has a resistance $R_B$. The output of the non-inverting summating amplifier 111 is connected on the one hand to one input of an analogue converter 301, controlled by the voltage $S_1$ which is one of the outputs of FIG. 11, on the other hand to the positive input of a differential amplifier 113 by way of a series resistance $R_{331}$. This positive input is also grounded by way of a resistance $R_{431}$. The negative input of the differential amplifier 113 is connected to the center of a potential divider 114 supplying a voltage equal to $(q/\gamma)C_{41}$ by way of a series resistance $R_{131}$. The differential amplifier 113 has a resistance $R_{231}$ in its feedback path and one chooses:

$$R_{131}/R_{231}=R_{331}/R_{431}=1$$

The output of the differential amplifier 113 is connected to one input of a second analogue coverter 302 controlled by the voltage $\overline{S}_2$ which is one of the outputs of FIG. 11.

A third analogue converter 303 which is controlled by the voltage $S_3$, which is also one of the outputs of FIG. 11, is connected through its input to the center of a potential divider 112 supplying a positive voltage corresponding to the quantity $-C_{30}/\gamma$.

The outputs of the analogue converters 301, 302 and 303 are connected in parallel to supply the voltage $u_3$ which controls the operation of the electrovalve 31 attached to the engine 3 by way of the jack 32.

In FIG. 13, a potential divider 116 supplies a positive voltage $-C_{40}/\gamma$ which constitutes the input voltage of a first analogue converter 401 which is controlled by the signal $S_1$ which is one of the outputs of FIG. 11.

A non-inverting, summating amplifier 115 is connected through its positive input on the one hand to an input $u_0$, i.e. to the output of the inverter amplifier 105 (FIG. 11), by way of a resistance $R_{143}$, on the other hand to the center of a potential divider 117 supplying a voltage $-\beta C_{40}$, by way of a resistance $R_{243}$. The negative input of the amplifier 115 is grounded by way of a resistance $R_{A43}$ and the feedback path of the amplifier has a resistance $R_{B43}$.

The resistances are chosen such that:

$$R_{A43}/R_{B43}=R_{143}/R_{243}; R_{143}=R_{243};$$
$$R_{B43}/R_{143}=1/\beta \delta$$

The output of the non-inverting summating amplifier 115 is connected to the input of a second analogue converter 402 controlled by the signal $S_3$ which is one of the outputs of FIG. 11.

Finally, a potential divider 118 supplies a positive voltage $(1/\delta)(C_{41}=C_{40})$ for the input of a third analogue converter 403 controlled by the signal $\overline{S}_2$ which is available at one of the outputs of FIG. 11.

The outputs of the three analogue converters 401, 402 and 403 are connected in parallel to supply at their common output the voltage $u_4$ which controls the operation of the electrovalve 41 attached to the engine 4 by way of the jack 42.

In FIG. 14, a first analogue converter 201 has its input connected to the battery positive. It is controlled by the signal $S_1$ which is available at one of the outputs of FIG. 11. A second analogue converter 202 has its input grounded and it is controlled by the signal $S_4$ which is available at one of the outputs of FIG. 11.

The outputs of the two analogue converters 201 and 202 are connected in parallel to supply at their common output the voltage $u_2$ which controls the operation of the electrovalve 21 connected to the coupling 2 by way of the jack 22.

When $u_2=0$, the coupling 2 is engaged.

When $u_2=+U$, the coupling 2 is disengaged.

The electronic system illustrated in FIGS. 11 to 14 operates as follows:

at the input of the logarithmic converter 101, the signal is the voltage $u_9$;

at the output the signal is equal to $-(KT/\beta) \cdot \log (u_g/RI_s)$ at the input of the logarithmic converter 102, the signal is the voltage $u_5$;

at the output the signal is equal to $-(KT/\beta) \cdot \log (u_5/RI_s)$

The differential amplifier 103 is provided with resistances such that $R_1/R_2=R_3/R_4$ and $R_1=R_2$. Consequently the signal is output is equal to $$-(R_2/R_1) \cdot KT/\beta \cdot \log (u_5/u_g) = -(KT/\beta) \cdot \log (u_5/u_g)$$

this last quantity is negative because $u_5$ is always greater than $u_9$. $u_5$ varies from $u_{51}$ to $u_{52}$ when the pressure in the accumulator 1 varies from $P_1$ to $P_2$ and $u_9$ varies from zero to $u_{92}$ according to the displacement of the torque control member 8. It is sufficient to choose $u_{51}$ and $u_{92}$ such that $u_{51}>u_{92}$.

The signal at the output of the antilogarithmic converter 104 is equal to $-RI_s(u_g/u_5)$ and the signal at the output of the inverter amplifier 105 is equal to $(R_{21}/R_{11})\cdot RI_s(u_g/u_5)$.

If one chooses the magnitudes $R_{11}$, $R_{21}$, and $I_S$ such that $(R_{21}/R_{11})RI_2 = m/\psi n$, the voltage $u_o = (m/\psi n)\cdot(u_g/u_5)$ is obtained at the output of the inverter amplifier 105. The elements 101 to 105 disposed as indicated in fact constitute a potential divider.

In the comparator 61, the positive input is equal to $C_{31}$ and the negative input is equal to $(m/\psi n)\cdot(u_g/u_5)$ which was the signal at the output of the inverter amplifier 105 as determined above.

The voltage $S_1$ at the output of the comparator 61 is:
$S_1 = 1$ for $C_{31} > (m/\psi n)\cdot(u_g/u_5)$
$S_1 = 0$ for $C_{31} < (m/\psi n)\cdot(u_g/u_5)$
$S_1$ is the control voltage for the analogue converters 201 (FIG. 14), 301 (FIG. 12), 401 (FIG. 13).

For the comparator 62, the signal at the positive input is equal to $\beta C_{41}$; the signal at the negative input is equal to $(m/\psi n)\cdot(u_g/u_5)$. The voltage $S_2$ at the output of the comparator 62 is:
$S_2 = 1$ for $\beta C_{41} > (m/\psi n)\cdot(U_g/U_5)$
$S_2 = 0$ for $\beta C_{41} < (m/\psi n)\cdot(U_g/U_5)$
From the voltage $S_2$ the voltage $\bar{S}_2$ is produced by the inverter 108. The voltage $\bar{S}_2$ is the control voltage for the analogue converters 302 of FIG. 12 and 403 of FIG. 13.

From the voltages $S_2$ and $\bar{S}_1$ is produced by means of the AND-gate 107 the voltage $S_3$ which is the control voltage for the converters 303 in FIG. 12 and 402 in FIG. 13.

Finally, from the voltages $S_3$ and $\bar{S}_2$ is produced by means of the OR-gate 109 the voltage $S_4$ which is the control voltage of the analogue converter 202 of FIG. 14.

The position can be summarized in the following table:

|  | $S_1$ | $S_2$ | $\bar{S}_1$ | $S_3$ | $\bar{S}_2$ | $S_4$ |
|---|---|---|---|---|---|---|
| $U_o < C_{31}$ | 1 | 1 | 0 | 0 | 0 | 0 |
| $C_{31} < U_o < \beta C_{41}$ | 0 | 1 | 1 | 1 | 0 | 1 |
| $U_o > \beta C_{41}$ | 0 | 0 | 1 | 0 | 1 | 1 |

In FIG. 12 the potential divider 110 gives the voltage $-C_{30}$.

In the non-inverting summating amplifier 111 the resistances are chosen such that $R_A//R_B = R_1//R_2$ with in additon $R_1 = R_2$ and $(R_B/R_1) = (1/\gamma)$.

In these conditions the output voltage is equal to $$\frac{1}{\gamma}\left(\frac{m}{\psi n}\cdot\frac{u_g}{u_5} - C_{30}\right)$$

it is the input voltage of the analogue converter 301 which is closed when $S_1 = 1$ and open in other cases.

The potential divider 112 supplies the voltage $-C_{30}/\gamma$ which is the input voltage of the analogue converter 303 which is closed when $S_3 = 1$.

Finally, for the differential amplifier 113 the signal at the positive input is equal to $$\frac{1}{\gamma}\left(\frac{m}{\psi \eta}\cdot\frac{U_g}{U_s} - C_{30}\right)$$

The signal at the negative input is equal to $(\beta/\gamma)C_{41}$ voltage supplied by the potential divider 114.

Consequently the signal at the output amounts to $$\frac{1}{\gamma}\left(\frac{\dot{m}}{\psi\eta}\cdot\frac{U_g}{U_s} - C_{30} - \beta C_{41}\right)$$

It constitutes the feed voltage of the analogue converter 302 which is closed when $\bar{S}_2 = 1$ or $S_2 = 0$.

In FIG. 13 the potential divider 116 supplies the voltage $-C_{40}/\gamma$ which constitutes the input voltage of the analogue converter 401 which is closed when $S_1 = 1$ and open in other cases.

The non-inverting summating amplifier 115 receives as signals at its positive input on the one hand a voltage $-\beta C_{40}$ supplied by the potential divider 117, on the other hand the quantity $U_o = (M/\psi n)\cdot(U_g/U_5)$ owing to the fact that it is connected to the output of the inverter amplifier 105 (FIG. 11) through its resistance $R_{143}$. The signal at its output is thus equal $(1/\beta\delta)(U_o - \beta C_{40})$ This value is the feed voltage of the analogue converter 402 which is closed when $S_3 = 1$ and opened in other cases.

Finally, the potential divider 118 supplies a voltage $(1/\delta)(C_{41} - C_{40})$ which constitutes the feed voltage of the analogue converter 403 which is closed when $\bar{S}_2 = 1$, supposing $S_2 = 0$ and opened in other cases.

As far as FIG. 14 is concerned it has already been seen before that when $u_2 = 0$ the coupling 2 is engaged and when $u_2 = +U$ corresponding to the signal $S_1 = 1$, the coupling 2 is disengaged.

By collecting the partial results indicating the signals transmitted by the different analogue converters illustrated in FIGS. 12, 13 and 14 in so far as they are closed by the control signal which is applied to them, these conditions being summarized in the table above, it will easily be seen that the electronic system contained in the logic block 90 controls the mechanical, hydropneumatic and oleopneumatic parts of the apparatus exactly as was desired.

As illustrated in FIG. 5, the common inputs of the logical units 80 and 90 are thus subjected to the voltages u9, u7 which are respectively proportional to the extent of depression of the accelerator pedal and to the effort exerted on the brake pedal and are delivered by the position and effort transducers 9 and 7 as well as subjected to the voltage u5 which is proportional to the pressure existing within the accumulator 1.

The voltages u2, u3 and u4 supplied to the electrovalves 21, 31 and 41 are delivered either by the unit 90 or by the unit 80. A number of different cases can arise.

In the first mode or so-called city traffic mode and in forward motion:
  if the driver accelerates, the voltages mentioned above are delivered by the unit 90;
  if the driver applies the brakes, said voltages are delivered by the unit 80.

In the first mode or so-called city traffic mode and in reverse motion, these voltages are delivered by the unit 80. It should be noted that brake application in reverse motion does not permit recovery of vehicle energies.

In the highway mode, the three voltages u2, u3, u4 delivered by the two units are respectively equal and correspond in particular to zero displacement of the motors so that they are stopped.

This regulating system comprises to this effect a certain number of switches which are illustrated in FIG. 6 and defined hereunder:

(1) a three-position switch 40 which is operated by the mode-selecting lever:

This switch:

switches the voltage u9 to the unit 90 when the lever is in the first mode and in forward motion (VAV);

switches the voltage u9 to the unit 80 when the lever is in the first mode and in reverse motion (VAR);

switches the voltage u9 to the central stud when the lever is in the second mode;

a two-position switch 41 which is operated by the mode-selecting lever.

Said switch:

switches the voltage u7 to the unit 80 when the lever is in the first mode and in forward motion (VAV);

switches the voltage u7 to an insulated stud 41 in all the other cases;

a two-position switch 42 which is operated by the mode-selecting lever:

Said switch:

switches the input voltages u9 and u7 of the units 80 and 90 to ground when the lever is in the second mode;

the two-position switches 44, 45 and 47 are closed respectively when the driver does not accelerate (NA), does not apply the brakes (NF) and when the lever is not in the first reverse-motion mode (NAR);

the three-position switch 46 which is operated by the mode-selecting lever connects the output of the contactor 44 to the electrovalves 21, 31 or 41 when the lever is in the first forward-motion mode (VAV), directly connects the output of the unit 80 to the same elements when the lever is in the first reverse-motion mode (VAR) and occupies a central position when the lever is in the second mode.

The switches 44, 45, 46 and 47 are each three in number and three identical circuits deliver the three voltages u2, u3 and u4.

(b) Control unit

The control unit 200 essentially comprises, as it may be seen in FIG. 7, a lever 201 connected to a selector (not shown) which is pivotally mounted about an axis x–x′ and capable of moving along said axis. In accordance with a mode of utilization which is already known in the field of gearbox or transmission control systems, the pivotal motion of the lever 201 about the axis x–x′ corresponds to the engagement of the two transmission ratios of the gearbox 102 whilst the displacement along the axis x–x′ corresponds to selection of the mechanical or hydrostatic transmission mode. The axis x–x′ is materialized by an actuating rod 202 which is capable of moving within the bore of a casing 203 and can take up two axial positions with or without a neutral position. The actuating rod 202 can be locked in each of its positions by means of a retractable-ball lock 204. The actuating rod 202 is also rigidly connected to an actuating arm 205, the extremity of which is capable of engaging in the corresponding recesses of two slide-bars 206, 207.

The first slide-bar 206 controls the movements of a shift fork for the sliding gear of positive-clutch system A which is mounted on the output shaft a3 of the gearbox as shown in FIG. 1. The two axial positions of said sliding gear on each side of a neutral position correspond respectively to the engagement of the two transmission ratios of the gearbox.

The second slide-bar 207 controls the movements of the shift forks for the sliding gears of positive-clutch systems B, C which are mounted on the intermediate shaft a2 and on the output shaft a4 respectively. The two axial positions of the sliding gear of B ensure the inactive state of the pump 104 or said pumps driving respectively. The two axial positions of the sliding gear of C ensure the inactive state of the hydraulic motor 3 or the clutch-engagement of the shaft a4 of the hydraulic motor 3 respectively.

The actuating rod 202 carries in the intermediate portion thereof a push-plate 208 which is applied against a spring 209. The spring 209 is applied against a first coupling lever 212. The first coupling lever 212 is applied against a second spring 213 and this latter spring bears on a push-plate 208 which is placed at the end of the rod 202. Said rod 202 is applied against a cam 214 which is rigidly fixed to a traction arm 215. The traction arm 215 is applied against the first coupling lever 212, the body of which carries coupling dogs 216 which are capable of engaging in the corresponding recesses of the body 217 of a second coupling lever 218.

The first lever 212 is secured to the control cable 219 of the gas throttle-disc 220. The second coupling lever 218 is secured to the traction cable 221 which is connected to the accelerator pedal 8 as shown in FIG. 7.

Depending on the mode employed, the different positions of the selecting lever 201 are as follows:

| first position, forward motion | } city traffic mode |
| first position, reverse motion | |
| second position, neutral | } highway mode |
| second position, first gear | |
| second position, second gear | |

The operation of the device is as follows:

(1) Highway mode:

The lever 201 is displaced axially towards the right-hand side of FIG. 7. The end of the actuating arm 205 is selectively engage either of the two transmission ratios provided by the gearbox 102. At the same time, the push-plate 208 displaces the cam 214 towards the right and compresses the second spring 213. The first coupling lever 212 moves towards the right by force of the spring 213 and the force of the traction arm 215. The coupling dogs 216 of the lever 212 engage in the corresponding recesses of the lever 218 and consequently lock the levers 212 and 218 in order to ensure transmission of the displacements of the accelerator pedal 8 to the gas throttle-disc 220.

(2) City traffic mode:

The lever 201 is displaced axially towards the left-hand side of FIG. 7. The end of the actuating arm 205 is engaged in the recess of the slide-bar 207, which makes it possible to establish the kinematic connection between the heat engine 101 and the pump 104 and between the hydraulic motor 3 and the gearbox output to the wheels of the vehicle. The end of the actuating rod 202 moves towards the left and permits expansion of the spring 213. The spring 209 forces the first coupling lever 212 towards the left, with the result that the coupling dogs 216 disengage from the corresponding recesses of the lever 218. The push-plate 208 displaces the cam 214 about the axis Z–Z' in order to produce a movement of rotation of the traction arm 215 and consequently a pivotal movement of the coupling lever 212.

The resultant traction on the cable 219 causes adjustments to the gas throttle-disc 202 of the engine carburetor in order to allow any necessary full supply adjustment of the heat engine for driving in the city traffic mode.

We claim:

1. A hybrid transmission system for a motor vehicle having an internal combustion engine, said hybrid transmission system comprising:
    a reversible, variable displacement hydraulic pump adapted to be driven by said internal combustion engine;
    an energy accumulator supplied by said pump;
    at least one hydraulic motor selectively supplied by said accumulator and said hydraulic pump;
    a mechanical transmission selectively driven by said engine and said hydraulic motor;
    means adapted to control the brakes of said vehicle;
    means adapted to control the acceleration of said vehicle;
    means for sensing brake application;
    means for sensing the acceleration of said vehicle;
    means for sensing the pressure in said accumulator;
    means for sensing the speed of said engine;
    means for sensing the displacement of said hydraulic pump;
    means for sensing the operation of said hydraulic motor;
    pump mode selection means for controlling the displacement of said reversible hydraulic pump;
    means for controlling the pressure in said accumulator;
    means for controlling the displacement of said reversible hydraulic motor;
    a first logic means responsive to signals from said accumulator pressure sensing means, said engine speed sensing means, and said pump displacement sensing means, for activating said pump mode selection means and for actuating said means for controlling the pressure in said accumulator;
    hydraulic motor coupling means for coupling said hydraulic motor to said transmission so that said transmission may be driven thereby;
    a second logic means responsive to signals from said accumulator pressure sensing means, said brake application sensing means, and said hydraulic motor operation sensing means, for activating said coupling means and for activating said means adapted to control the brakes of said vehicle;
    the second logic means having a comparator which is known per se, the output of said comparator being adapted to supply on the one hand the control electrode of a first analog switch and through a reversing switch the control electrode of a second analog switch and a third analog switch and, on the other hand, the control electrode of a fourth analog switch;
    engine coupling means for coupling said engine to said transmission so that said transmission may be driven thereby;
    a third logic means responsive to signals from said accumulator pressure sensing means, and vehicle acceleration sensing means, for activating said means for controlling the displacement of said hydraulic motor and for selectively activating said hydraulic motor coupling means and said engine coupling means; and
    control and switching means for controlling the operation of said mechanical transmission, said control and switching means responsive to signal from said vehicle acceleration sensing means, and said brake application sensing means for activating said means fro controlling the displacement of said reversible hydraulic motor and for selectively activating said hydraulic motor coupling means and said engine coupling means.

2. A transmission system as defined in claim 1, wherein the outputs of the two analog switches supply two contactors having non-operating and operating positions such that the operating position permits delivery of the control signal of the electromagnet of the distributor which is supplied by the valve for modulating the braking effort and wherein the outputs of the two analog switches supply two contactors having non-operating and operating positions such that the operating position permits delivery of the control signal of the electromagnet of the distributor which is supplied by the valve for modulating the braking effort.

3. A hybrid transmission system for a motor vehicle having an internal combustion engine, said hybrid transmission system comprising:
    a reversible, variable displacement hydraulic pump adapted to be driven by said internal combustion engine;
    an energy accumulator supplied by said pump;
    at least one hydraulic motor selectively supplied by said accumulator and said hydraulic pump;
    a mechanical transmission selectively driven by said engine and said hydraulic motor;
    means adapted to control the brakes of said vehicle;
    means adapted to control the acceleration of said vehicle;
    means for sensing brake application;
    means for sensing the acceleration of said vehicle;
    means for sensing the pressure in said accumulator;
    means for sensing the speed of said engine;
    means for sensing the displacement of said hydraulic pump;
    means for sensing the operation of said hydraulic motor;
    pump mode selection means for controlling the displacement of said reversible hydraulic pump;
    means for controlling the pressure in said accumulator;
    means for controlling the displacement of said reversible hydraulic motor;
    a first logic means responsive to signals from said accumulator pressure sensing means, said engine speed sensing means, and said pump displacement sensing means, for activating said pump mode selection means and for actuating said means for controlling the pressure in said accumulator;
    hydraulic motor coupling means for coupling said hydraulic motor to said transmission so that said transmission may be driven thereby;
    a second logic means responsive to signals from said accumulator pressure sensing means, said brake application sensing means, and said hydraulic motor operation sensing means, for activating said coupling means and for activating said means adapted to control the brakes of said vehicle;

engine coupling means for coupling said engine to said transmission so that said transmission may be driven thereby;

a third logic means responsive to signals from said accumulator pressure sensing means, and vehicle acceleration sensing means, for activating said means for controlling the displacement of said reversible hydraulic motor and for selectively activating said hydraulic motor coupling means and said engine coupling means;

control and switching means for controlling the operation of said mechanical transmission, said control and switching means responsive to signal from said vehicle acceleration sensing means, and said brake application sensing means for activating said means for controlling the displacement of said reversible hydraulic motor and for selectively activating said hydraulic motor coupling means and said engine coupling means; and said switching means comprises a lever for selecting the devices for controlling the gearbox and devices for controlling the hydrostatic transmission and a control rod adapted to cooperate with a first coupling lever and a second coupling lever, said levers being connected respectively to the accelerator pedal and to the device for controlling the gas throttle-disc of the heat engine, said coupling lever being provided with coupling means whose position is controlled in dependence on the axial position of the control rod.

* * * * *